Figure 1:
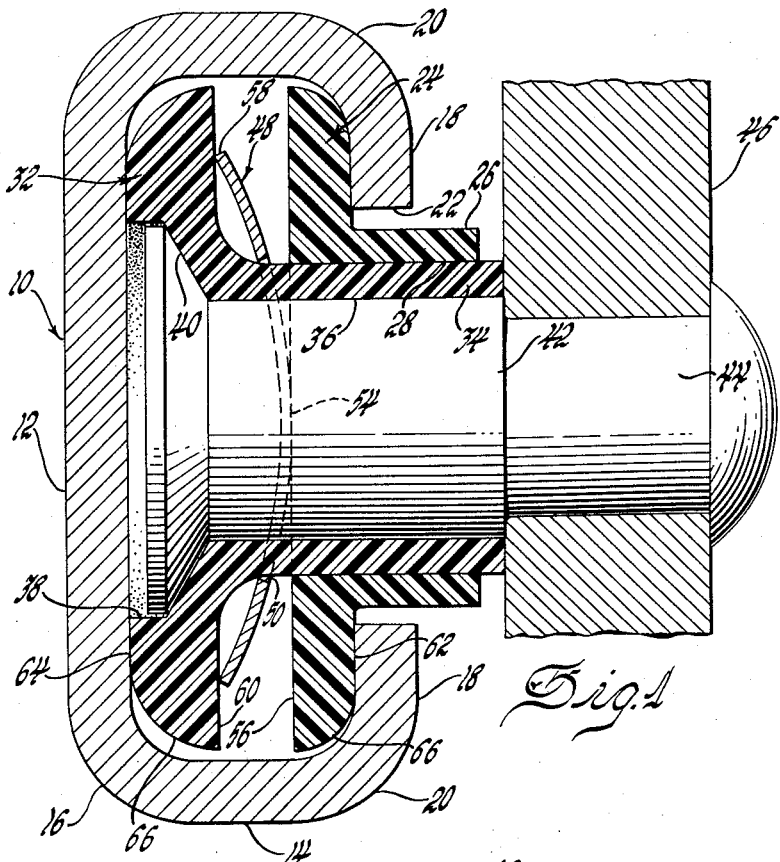

Nov. 10, 1959     C. J. GRISWOLD, JR     2,912,288
GUIDE ROLLER
Filed Oct. 9, 1957

INVENTOR.
Charles J. Griswold, Jr.
BY W. S. Pettigrew
ATTORNEY

United States Patent Office 2,912,288
Patented Nov. 10, 1959

2,912,288

GUIDE ROLLER

Charles J. Griswold, Jr., Oak Park, Mich., assignor to General Motors Corporation, Detroit, Mich., a corporation of Delaware Application October 9, 1957, Serial No. 689,201

7 Claims. (Cl. 308—6)

This invention relates to guide rollers and more particularly to split type guide rollers for use with guide or cam channels.

In the past, unitary metal guide rollers of generally disc shape have been commonly used with guide or cam channels, with the roller being provided with a hub or stud for attachment of the roller to an operating member. Metal guide rollers of the unitary type have several important disadvantages, one of which is the metal to metal contact of the guide roller with the cam channel which requires that the channel be continually lubricated to prevent any undue wear or scouring of either the channel or the guide roller. Another important disadvantage is the lack of a continuous surface to surface contact of the opposite sides of the roller with the respective opposite sides of the channel, regardless of whether the roller is stationary in the channel or is moving therein. This lack of surface to surface contact often causes rattling and other objectionable noises and may also lead to undue wear or brinelling of particular portions of either the roller or channel. Such surface to surface contact is difficult to obtain in mass produced parts due to manufacturing tolerances of both the roller and the channel.

The guide roller of this invention overcomes these disadvantages of the more common unitary type of metal guide rollers by providing a split type guide roller of nylon, which is generally a polymer of a methylene diamine and a dicarboxylic acid, the most commonly used of which are hexamethylene diamine and adipic acid. The guide roller generally comprises a pair of nylon discs, each of which is provided with an integral hub having a bore therethrough. The hub of one disc is slidably mounted on that of the other disc and a stud or pivot pin which fits within the bore of the other disc and is secured therein provides a connection between the guide roller and an operating member. A spring washer, either of the concave-convex or of the wavy type, fits on the hub of the other disc member and engages each of the members to bias the members apart. Thus, when the guide roller is inserted within the cam channel, the spring insures that the opposite flat faces of the members engage opposite respective faces of the channel in surface to surface contact to prevent any rattling or other objectionable noise, regardless of whether the roller is stationary in the channel or is moving therein.

Nylon has a high tensile strength, a moderate impact strength, and inherent lubricating properties. Thus, there is no need for the cam channel to be lubricated since the guide roller furnishes its own lubrication due to the properties of the material of which it is made. Thus, the guide roller of this invention overcomes the several disadvantages of the more common unitary type of metal guide roller and provides a new and improved guide roller which can be mass produced and which can be used with mass produced guide channels since the opposite faces of the guide roller engage the respective opposite sides of the channel in surface to surface contact therewith within normal manufacturing tolerances of both the roller and the channel.

The primary object of this invention is to provide a new and improved guide roller. Another object of this invention is to provide a new and improved split type guide roller. A further object of this invention is to provide a new and improved split type nylon guide roller. Yet another object of this invention is to provide a new and improved split type nylon guide roller for use in guide or cam channels which does not require any lubrication and which does not cause rattling or other objectionable noises regardless of whether the roller is stationary or moving in the channel.

Figure 2:
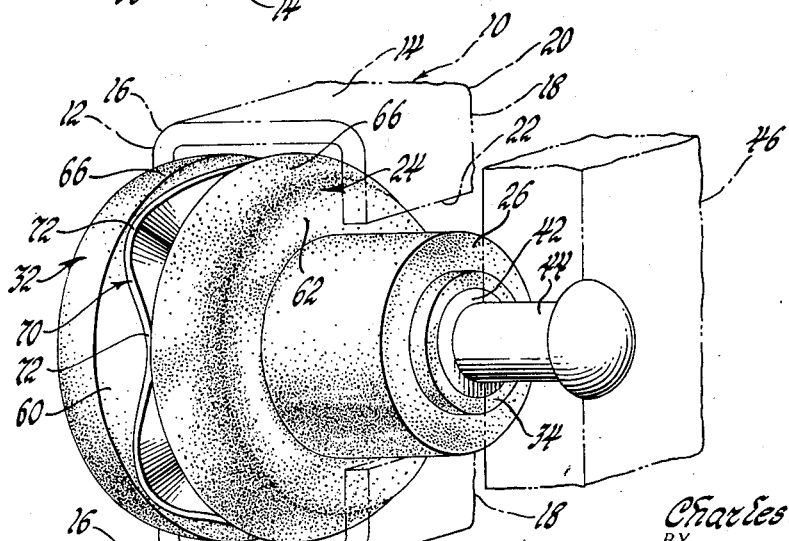

These and other objectives of this invention will be readily apparent from the following specification and drawings, wherein:

Figure 1 is a view, partially in section, or a split type nylon guide roller according to one embodiment of this invention; and Figure 2 is a perspective view of a split type nylon guide roller according to another embodiment of this invention.

Referring now to Figure 1 of the drawings, a guide or cam channel 10 of generally elongated C shape includes a wall 12 joined to opposite laterally extending walls 14 by arcuate wall junction portions 16, and a pair of walls 18 generally parallel to wall 12 and joined to walls 14 by arcuate wall juncture portions 20. Figure 1 is a transverse section through the channel 10 and the walls 18 define a slot 22 extending longitudinally of the channel. The guide roller generally comprises a first disc-shaped nylon member 24 provided with an integral hub 26 and a bore 28 therethrough and through the member, and a second disc-shaped nylon member 32 having an integral hub 34 and a bore 36 therethrough joined to a bore 38 of larger diameter in the member by a generally conically-shaped bore 40. The hub 34 of member 32 is slidably and rotatably received within the bore 28 of member 24. A metal stud or pin 42 of generally the shape of bores 36, 38 and 40 is received therein and includes an integral stud 44 of reduced diameter. An operating member 46 is slidably received on stud 44 and the end of the stud is headed over to fixedly secure member 46 to the stud in engagement with the shoulder between studs 42 and 44. In addition, the member 46 engages the end of hub 34 to fixedly secure member 32 to the stud 42. A concave-convex spring washer 48 provided with a central opening 50 is slidably and rotatably received on the hub 34 of member 32, and has its central portion 54 bearing against the flat inner face 56 of member 24 on diametrically opposite portions of the face immediately adjacent the bore 28 of the member. The peripheral edge portion 58 of the washer bears against the inner flat face 60 of member 32 so as to bias the members apart with respect to each other.

When the members are inserted within the cam channel, the spring washer 48 biases the members apart with respect to each other so that the outer flat faces 62 and 64 of the members 24 and 32, respectively, engage the inner surfaces of walls 18 and wall 12, respectively, in continuous surface to surface contact, regardless of whether the roller is moving within the channel or is stationary therein. Since nylon has inherent lubricating properties, there is no need for any lubrication to be applied to the inner surfaces of walls 18 or wall 12. Additionally, since nylon has a moderate impact strength while the metal channel 10 has a higher impact strength, there is no likelihood of the nylon members 24 and 32 scoring or causing undue wear of the inner surfaces of the walls 18 and 12.

The use of the spring washer 48 allows the guide roller to be mass produced and to be used with mass produced guide or cam channels. Since the spacing between walls 18 and wall 12 may vary and also the thickness of members 24 and 32 may vary, any such variation will easily be taken up by the spring washer 48 so that the faces 62 and 64 of members 24 and 32 will always be in surface to surface contact with the inner surfaces of walls 18 and wall 12, respectively. Additionally, it will be noted that hub 26 is shorter than hub 34 so that member 24 can slide axially outwardly of member 32 within predetermined limits before the hub 26 engages member 46.

It is intended that member 46 be either manually or power operated so as to move the guide roller within the cam channel. Additionally, it will be noted that the hubs 26 and 34 of member 24 and 32 are in surface to surface contact with each other and that member 24 can rotate independently of member 32. Since both members are of the same material having inherent lubricating properties, there is no need for any lubricant to be applied between the contacting surfaces of the hubs of the members.

It will also be noted that the outer edge portions 66 of members 24 and 32 are generally rounded and that the diameters of the members are less than the width of the channel or the space between the walls 14. As previously mentioned, mass produced rollers and mass produced cam channels are subject to manufacturing tolerances. By making the diameters of the members 24 and 32 slightly less than the spacing between the walls 14, any interference between the rollers and the walls 14 is avoided when the parts are mass produced. Additionally, since the diameter of the hub 26 of member 24 is less than the distance between the walls 18, there is a possibility that the roller may shift laterally within the channel, and the relationship between the diameters of the rollers 24 and 32 and the spacing between walls 14 allows this shifting movement. It will further be noted that the radius of the edge portions 66 of members 24 and 32 is greater than the radius of the wall juncture portions 16 and 20. This difference in radii prevents the edge portions 66 from in any manner engaging the inner surfaces of the juncture portions 16 and 20 so as to move either member 24 or 32 toward the other member or to move the outer surface of the member out of surface to surface engagement with the inner surface of either walls 18 or wall 12.

The guide roller shown in Figure 2 of the drawings is the same as that shown in Figure 1 of the drawings except that a wavy type of spring washer 70 is employed to bias the members 24 and 32 apart rather than the concave-convex type of spring washer 48. The washer 70 is received on the hub 34 of member 32 in the same manner as washer 48 and the alternate opposite flutes 72 of washer 70 alternately engage the inner surfaces 56 and 60 of members 24 and 32. Since the guide roller shown in Figure 2 is the same as that shown in Figure 1 in all other respects, like numerals have been used for like parts.

Thus, this invention provides a new and improved split type nylon guide roller for use in guide or cam channels which does not require any lubrication and which can be mass produced and used with mass produced cam channels without causing rattling or other objectionable noises due to the lack of a surface to surface contact between the opposite flat faces of the member and respective opposite flat faces of the guide or cam channel.

The claims:

1. A split type guide roller comprising, a first disc-shaped nylon member having a hub, a second disc-shaped nylon member provided with a hub having a bore therethrough to slidably and rotatably receive the hub of said first member whereby said members are independently rotatable about the common axis of rotation thereof and are independently slidable along said axis, and a resilient spring washer slidably mounted on the hub of said first member and frictionally bearing against each of said members to exert a continuous resilient force biasing said members apart with respect to each other along said common axis while permitting independent rotation of each about said common axis.

2. A split type guide roller comprising, a first disc-shaped nylon member having a hub, a second disc-shaped nylon member provided with a hub having a bore therethrough to slidably and rotatably receive the hub of said first member whereby said members are independently rotatable about the common axis of rotation thereof and are independently slidable along said axis, and a concave-convex spring washer slidably received on the hub of said first member and engaging each of said members to exert a continuous resilient force biasing said members apart with respect to each other along said common axis while permitting independent rotation of each about said common axis.

3. A split type guide roller comprising, a first disc-shaped nylon member having a hub, a second disc-shaped nylon member provided with a hub having a bore therethrough to slidably and rotatably receive the hub of said first member whereby said members are independently rotatable about the common axis of rotation thereof and are independently slidable along said axis, and a wavy spring washer slidably received on the hub of said first member and having alternate flutes alternately frictionally engaging each of said members to exert a continuous resilient force biasing said members apart with respect to each other along said common axis while permitting independent rotation of each about said common axis.

4. A guide roller comprising, a first roller member having a hub portion and a radially extending flange portion provided with an outer periphery of arcuate shape, a second roller member having a hub portion with a bore therethrough and a radially extending flange portion provided with an outer periphery of arcuate shape, the hub portion of said second member being slidably received on the hub portion of said first member whereby said members are independently rotatable about the common axis of rotation thereof and are independently slidable along said axis, said outer periphery of said second member facing oppositely to the outer periphery of said first member whereby said outer peripheries define a rounded tire portion, and a resilient spring washer slidably mounted on the hub of said first member and frictionally engageable with each of said members to exert a continuous resilient force biasing said members apart with respect to each other along said common axis while permitting independent rotation of each about said common axis.

5. A guide roller comprising, a first roller member having a hub portion with a bore therethrough and a radially extending annular portion provided with an outer periphery of arcuate shape, a shaft fitting within said bore and secured to said roller member for defining the axis of rotation thereof, a second roller member having a hub portion with a bore therethrough and a radially extending annular portion provided with an outer periphery of arcuate shape complementary to the outer periphery of said first member, said second member being slidably mounted on the hub portion of said first member with said shaft projecting through the bore of said second member whereby said members are independently rotatable about said axis of rotation and are independently slidable along said axis, said outer periphery of said second member facing oppositely to the outer periphery of said first member whereby said outer peripheries define a rounded tire portion, and a resilient washer slidably mounted on the hub of said first member intermediate said first and second members and frictionally engageable therewith to exert a continuous resilient force biasing said members apart with respect to each other along the common axis of rotation thereof while permitting independent rotation of each about said common axis.

6. In combination with a guide channel having a pair of oppositely facing walls, one of said walls being slotted longitudinally thereof, a split type guide roller comprising, a first disc-shaped nylon member having an outer surface thereof in engagement with the other of said walls in surface to surface contact therewith and provided with a hub extending through the slot in said one of said walls, a second disc-shaped nylon member having an outer surface engaging the other of said walls in surface to surface contact therewith to either side of said slot and having a hub extending through said slot and provided with a bore to slidably and rotatably receive the hub of said first member whereby said members are independently rotatable about the common axis of rotation thereof and are independently slidable along said axis, and a resilient spring washer slidably mounted on the hub of said first member and frictionally bearing against each of said members to exert a continuous resilient force biasing said members apart with respect to each other along said common axis and thereby maintain the outer surfaces thereof in surface to surface contact with respective walls of said channel while permitting independent rotation of each about said common axis.

7. In combination with a guide channel having a pair of spaced walls joined to intermediate walls by arcuate wall juncture portions, with one of said spaced walls being slotted longitudinally thereof, a guide roller comprising, a first disc-shaped nylon member having an outer annular surface in engagement with the other of said spaced walls in surface to surface contact therewith and being provided with a hub extending outwardly of said channel through said slot in said one of said spaced walls, a second disc-shaped nylon member having an outer annular surface in engagement with said one of said spaced walls in surface to surface contact therewith to either side of said slot, said second member being provided with a hub extending outwardly of said channel through said slot and having a bore therethrough to slidably and rotatably receive the hub of said first member whereby said members are independently rotatable about the common axis of rotation thereof and are independently slidable along said axis, said first and second members including an outer arcuate edge portion of a radius different than the radius of said wall juncture portions, and a resilient spring washer slidably mounted on the hub of said first member and frictionally bearing against each of said members to exert a continuous resilient force biasing said members apart with respect to each other along said common axis to thereby maintain the surface to surface contact between the outer annular surfaces of said members and said respective spaced walls while permitting independent rotation of said members about said common axis.

References Cited in the file of this patent

UNITED STATES PATENTS

| 742,229 | Petsche | Oct. 27, 1903 |
| 2,497,224 | Laure | Feb. 14, 1950 |
| 2,556,612 | Buntin | June 12, 1951 |